United States Patent
Gane et al.

(10) Patent No.: US 8,057,683 B2
(45) Date of Patent: *Nov. 15, 2011

(54) PROCESS FOR THE REMOVAL OF ENDOCRINE DISRUPTING COMPOUNDS

(75) Inventors: Patrick A. C. Gane, Rothrist (CH);
Joachim Schölkopf, Killwangen (CH);
Daniel Gantenbein, Gempen (CH);
Daniel E. Gerard, Basel (CH)

(73) Assignee: Omya Development AG, Oftringen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 12/449,935

(22) PCT Filed: Mar. 19, 2008

(86) PCT No.: PCT/EP2008/053333
§ 371 (c)(1),
(2), (4) Date: Nov. 13, 2009

(87) PCT Pub. No.: WO2008/113838
PCT Pub. Date: Sep. 25, 2008

(65) Prior Publication Data
US 2010/0059708 A1    Mar. 11, 2010

(30) Foreign Application Priority Data
Mar. 21, 2007    (EP) .................................. 07005855

(51) Int. Cl.
*C02F 1/28* (2006.01)
(52) U.S. Cl. ........ 210/691; 210/600; 210/660; 210/663; 210/665; 210/667
(58) Field of Classification Search .................... None
See application file for complete search history.

(56) References Cited

U.S. PATENT DOCUMENTS

| | | |
|---|---|---|
| 2,613,181 A | 9/1947 | Green et al. |
| 4,343,706 A | 8/1982 | Etzel et al. |
| 4,416,780 A | 11/1983 | Disselbeck |
| 6,210,526 B1 | 4/2001 | Pohlen |
| 6,666,953 B1 | 12/2003 | Gane et al. |
| 2003/0196966 A1 | 10/2003 | Hughes |
| 2004/0020410 A1 | 2/2004 | Gane |

(Continued)

FOREIGN PATENT DOCUMENTS
CZ      9300287 A3    1/1995
(Continued)

OTHER PUBLICATIONS

The International Search Report for PCT Application No. PCT/EP2008/053333.
The Written Opinion of the International Searching Authority for PCT Application No. PCT/EP2008/053333.

(Continued)

*Primary Examiner* — Yelena G Gakh
*Assistant Examiner* — David Weisz
(74) *Attorney, Agent, or Firm* — Amster, Rothstein & Ebenstein LLP; Craig J. Arnold

(57) ABSTRACT

The present invention relates to the removal of endocrine disrupting compounds from an aqueous medium by adding surface-reacted natural calcium carbonate or an aqueous suspension comprising surface-reacted calcium carbonate and having a pH greater than 6.0 measured at 20° C., to the medium, wherein the surface-reacted calcium carbonate is a reaction product of natural calcium carbonate with carbon dioxide and one or more acids, the use of the surface-reacted natural calcium carbonate for the removal of endocrine disrupting compounds, as well as to a combination of a surface-reacted natural calcium carbonate and activated carbon for the removal of endocrine disrupting compounds.

39 Claims, 5 Drawing Sheets

U.S. PATENT DOCUMENTS

| | | |
|---|---|---|
| 2004/0238454 A1 | 12/2004 | Mori et al. |
| 2005/0175577 A1 | 8/2005 | Jenkins et al. |
| 2006/0048908 A1 | 3/2006 | Wang et al. |

FOREIGN PATENT DOCUMENTS

| | | |
|---|---|---|
| EP | 0 989 229 A1 | 3/2000 |
| EP | 1 186 343 A1 | 3/2002 |
| EP | 1607373 | 12/2003 |
| GB | 662646 | 8/1948 |
| JP | 2000/140834 | 5/2000 |
| JP | 2002/346572 | 12/2002 |
| WO | WO 00/39222 | 7/2000 |
| WO | WO 02/064703 | 8/2002 |
| WO | WO 2004/083316 A | 9/2004 |
| WO | WO 2005/042412 A1 | 5/2005 |

OTHER PUBLICATIONS

Tsai et al. "Adsorption of bisphenol-A from aqueous solution onto minerals and carbon adsorbents." Journal of Hazardous Materials B134 (2006), pp. 169-175.

Zhang et al. "Removal of estrone and 17β-estradiol from water by adsorption." Water Research 39 (2005) pp. 3991-4003.

The Communication dated Oct. 5, 2007 for European Application No. 07005855.7.

Teir et al. "Production of Precipitated Calcium Carbonate from Calcium Silicates and Carbon Dioxide." Energy Conversion and Management 46 (2005) 2954-2979.

Snyder et al. Role of Membranes and Activated Carbon in the Removal of Endocrine Disruptors and Pharmaceuticals. Desalination 202 (2007) 156-181.

PROCESS FOR THE REMOVAL OF ENDOCRINE DISRUPTING COMPOUNDS

This is a U.S. national phase of PCT Application No. PCT/EP2008/053333, filed Mar. 19, 2008, which claims the benefit of European Application No. 07005855.7, filed Mar. 21, 2007.

The present invention relates to a process for the removal of endocrine disrupting compounds, to the use of surface-reacted calcium carbonate in such a process, a combination with activated carbon and a composite of surface-reacted calcium carbonate and endocrine disrupting compounds, optionally adsorbed onto activated carbon.

Municipal wastewater treatment plants are constructed in order to remove organic compounds in an efficient way by coagulation and by biological degradation. Compounds such as phosphates and heavy metals are removed by precipitation or are adsorbed on activated carbon. The removal of pharmaceuticals and personal care products (PPCPs) is, however, generally neglected. The latter comprise a large group of chemical classes, many of which possess potent biological activity. One group of PPCPs in focus are the endocrine disrupting compounds (EDCs).

There is an increasing concern about the ubiquity of EDCs of whatever origin in the environment. Indeed, the information regarding a possible role of these compounds in a number of negative health trends in wildlife and man continues to grow, including the hormonal imbalance (feminization) and altered reproductive success in wildlife such as in fish and avian; and the increased incidence of breast, testicular and prostate cancer as well as immunological and neurological dysfunctions in humans. These events may occur at relative low, environmentally relevant concentrations of 0.1-20 $ngdm^{-3}$. Thanks to the continuously decreasing detection limit of EDCs, a better understanding about the availability and effect of these compounds in the environment is possible.

Because, e.g. many of the known natural and synthetic estrogens are expected to end up in the aquatic environment via sewage, the most likely source of EDCs in the aquatic environment is the discharge of municipal and/or industrial effluents, together with the runoff from agricultural production. Hence, it is necessary to focus on the removal of these compounds by municipal wastewater treatment plants (WTPs). Many of the investigations so far have focused on the removal capacity of EDCs by conventional WTPs and advanced techniques such as reverse osmosis or photo catalysis, which however require a considerable technical equipment and costs.

Well-known adsorbents such as activated carbon or bentonite have the general drawback that they are very difficult to separate after the adsorption of the substance to be removed from the medium due to their finely divided state.

Consequently, there is a continuous need for low-cost effective treatments for the efficient removal of substances like EDCs from water like municipal wastewater.

The above object has been solved by a process for the removal of EDCs from an aqueous medium, wherein a surface-reacted natural calcium carbonate (SRCC) or an aqueous suspension comprising a surface-reacted calcium carbonate and having a pH greater than 6.0 measured at 20° C. is brought into contact with the EDC containing medium, the surface-reacted natural calcium carbonate being the reaction product of a natural calcium carbonate with carbon dioxide and one or more acids.

The water, which can be treated by the process of the present invention, generally is any water containing EDCs, e.g. urban waste water, industrial waste water, drinking water, agricultural waste water or waste water from breweries or other beverage industries.

The surface-reacted natural calcium carbonate to be used in the process of the present invention is obtained by reacting a natural calcium carbonate with an acid and with carbon dioxide, wherein the carbon dioxide is formed in situ by the acid treatment and/or is supplied from an external source.

Preferably, the natural calcium carbonate is selected from the group comprising a marble, a chalk, a calcite, a dolomite, limestone and mixtures thereof. In a preferred embodiment, the natural calcium carbonate is ground prior to the treatment with an acid and carbon dioxide. The grinding step can be carried out with any conventional grinding device such as a grinding mill known to the skilled person.

Preferably the surface-reacted natural calcium carbonate to be used in the process of the present invention is prepared as an aqueous suspension having a pH measured at 20° C., of greater than 6.0, preferably greater than 6.5, more preferably greater than 7.0, even more preferably greater than 7.5. As will be discussed below, the surface-reacted natural calcium carbonate can be brought into contact with the water to be purified by adding said aqueous suspension to the water. It is also possible to modify the pH of the aqueous suspension prior to its addition to the water to be purified, e.g. by dilution with additional water. Alternatively, the aqueous suspension can be dried and the surface-reacted natural calcium carbonate brought into contact with the water is in powder form or in the form of granules. In other words, the increase of pH to a value of greater than 6.0 subsequent to treatment with an acid and carbon dioxide is needed to provide the surface-reacted calcium carbonate having the beneficial adsorption properties described herein.

In a preferred process for the preparation of the aqueous suspension, the natural calcium carbonate, either finely divided, such as by grinding, or not, is suspended in water. Preferably, the slurry has a content of natural calcium carbonate within the range of 1 wt % to 80 wt %, more preferably 3 wt % to 60 wt %, and even more preferably 5 wt % to 40 wt %, based on the weight of the slurry.

In a next step, an acid is added to the aqueous suspension containing the natural calcium carbonate. Preferably, the acid has a $pK_a$ at 25° C. of 2.5 or less. If the $pK_a$ at 25° C. is 0 or less, the acid is preferably selected from sulphuric acid, hydrochloric acid, or mixtures thereof. If the $pK_a$ at 25° C. is from 0 to 2.5, the acid is preferably selected from $H_2SO_3$, $HSO_4^-$, $H_3PO_4$, oxalic acid or mixtures thereof. The one or more acids can be added to the suspension as a concentrated solution or a more diluted solution. Preferably, the molar ratio of the acid to the natural calcium carbonate is from 0.05 to 4, more preferably from 0.1 to 2.

As an alternative, it is also possible to add the acid to the water before the natural calcium carbonate is suspended.

In a next step, the natural calcium carbonate is treated with carbon dioxide. If a strong acid such as sulphuric acid or hydrochloric acid is used for the acid treatment of the natural calcium carbonate, the carbon dioxide is automatically formed. Alternatively or additionally, the carbon dioxide can be supplied from an external source.

Acid treatment and treatment with carbon dioxide can be carried out simultaneously which is the case when a strong acid is used. It is also possible to carry out acid treatment first, e.g. with a medium strong acid having a $pK_a$ in the range of 0 to 2.5, followed by treatment with carbon dioxide supplied from an external source.

Preferably, the concentration of gaseous carbon dioxide in the suspension is, in terms of volume, such that the ratio (volume of suspension):(volume of gaseous $CO_2$) is from 1:0.05 to 1:20, even more preferably 1:0.05 to 1:5.

In a preferred embodiment, the acid treatment step and/or the carbon dioxide treatment step are repeated at least once, more preferably several times.

Subsequent to the acid treatment and carbon dioxide treatment, the pH of the aqueous suspension, measured at 20° C., naturally reaches a value of greater than 6.0, preferably greater than 6.5, more preferably greater than 7.0, even more preferably greater than 7.5, thereby preparing the surface-reacted natural calcium carbonate as an aqueous suspension having a pH of greater than 6.0, preferably greater than 6.5, more preferably greater than 7.0, even more preferably greater than 7.5. If the aqueous suspension is allowed to reach equilibrium, the pH is greater than 7. A pH of greater than 6.0 can be adjusted without the addition of a base when stirring of the aqueous suspension is continued for a sufficient time period, preferably 1 hour to 10 hours, more preferably 1 to 5 hours.

Alternatively, prior to reaching equilibrium, which occurs at a pH greater than 7, the pH of the aqueous suspension may be increased to a value greater that 6 by adding a base subsequent to carbon dioxide treatment. Any conventional base such as sodium hydroxide or potassium hydroxide can be used.

With the process steps described above, i.e. acid treatment, treatment with carbon dioxide and, preferably, pH adjustment, a surface-reacted natural calcium carbonate is obtained having good adsorption properties for EDCs to be removed from an aqueous medium.

Further details about the preparation of the surface-reacted natural calcium carbonate are disclosed in WO 00/39222 and US 2004/0020410 A1, wherein the surface-reacted natural calcium carbonate is described as a filler for paper manufacture, the content of these references herewith being included in the present application.

In a preferred embodiment of the preparation of the surface-reacted natural calcium carbonate, the natural calcium carbonate is reacted with the acid and/or the carbon dioxide in the presence of at least one compound selected from the group consisting of silicate, silica, aluminium hydroxide, earth alkali aluminate such as sodium or potassium aluminate, magnesium oxide, or mixtures thereof. Preferably, the at least one silicate is selected from an aluminium silicate, a calcium silicate, or an earth alkali metal silicate. These components can be added to an aqueous suspension comprising the natural calcium carbonate before adding the acid and/or carbon dioxide.

Alternatively, the silicate and/or silica and/or aluminium hydroxide and/or earth alkali aluminate and/or magnesium oxide component(s) can be added to the aqueous suspension of natural calcium carbonate while the reaction of natural calcium carbonate with an acid and carbon dioxide has already started. Further details about the preparation of the surface-reacted natural calcium carbonate in the presence of at least one silicate and/or silica and/or aluminium hydroxide and/or earth alkali aluminate component(s) are disclosed in WO 2004/083316, the content of this reference herewith being included in the present application.

The surface-reacted natural calcium carbonate can be kept in suspension, optionally further stabilised by a dispersant. Conventional dispersants known to the skilled person can be used. A preferred dispersant is polyacrylic acid.

Alternatively, the aqueous suspension described above can be dried, thereby obtaining the surface-reacted natural calcium carbonate in the form of granules or a powder.

In a preferred embodiment, the surface-reacted natural calcium carbonate has a specific surface area of from 5 $m^2/g$ to 200 $m^2/g$, more preferably 20 $m^2/g$ to 80 $m^2/g$ and even more preferably 30 $m^2/g$ to 60 $m^2/g$, measured using nitrogen and the BET method according to ISO 9277.

Furthermore, it is preferred that the surface-reacted natural calcium carbonate has a mean grain diameter of from 0.1 to 50 µm, more preferably from 0.5 to 25 µm, even more preferably 1 to 10 µm, measured according to the sedimentation method. The sedimentation method is an analysis of sedimentation behaviour in a gravimetric field. The measurement is made with a Sedigraph™ 5100 of Micromeritics Instrument Corporation. The method and the instrument are known to the skilled person and are commonly used to determine grain size of fillers and pigments. The measurement is carried out in an aqueous solution of 0.1 wt % $Na_4P_2O_7$. The samples were dispersed using a high speed stirrer and supersonic.

In a preferred embodiment, the surface-reacted natural calcium carbonate has a specific surface area within the range of 15 to 200 $m^2/g$ and a mean grain diameter within the range of 0.1 to 50 µm. More preferably, the specific surface area is within the range of 20 to 80 $m^2/g$ and the mean grain diameter is within the range of 0.5 to 25 µm. Even more preferably, the specific surface area is within the range of 30 to 60 $m^2/g$ and the mean grain diameter is within the range of 0.7 to 7 µm.

In the process of the present invention, the surface-reacted natural calcium carbonate is added to the EDCs containing aqueous medium by any conventional feeding means known to the skilled person. The surface-reacted natural calcium carbonate can be added as an aqueous suspension, e.g. the suspension described above. Alternatively, it can be added in solid form, e.g. in the form of granules or a powder or in the form of a cake. Within the context of the present invention, it is also possible to provide an immobile phase comprising the surface-reacted natural calcium carbonate, the water to be purified running through said immobile phase, e.g. in the form of a cake or layer, comprising the surface-reacted natural calcium carbonate, the water to be purified running through said immobile phase. This will be discussed in further detail below.

In a preferred embodiment, the pH of the EDCs containing aqueous medium is adjusted to a value of greater than 6.0, more preferably greater than 6.5, and even more preferably greater than 7.0 prior to the addition of the surface-reacted natural calcium carbonate.

The surface-reacted natural calcium carbonate preferable is suspended in the aqueous medium, e.g. by agitation means. The mass of surface-reacted natural calcium carbonate depends on the type of EDCs to be removed. Preferably, SRCC is added in dosages (weight-based) of $10^2$ to $10^9$ times the mass of EDCs, preferably $2 \cdot 10^4$ to $10^6$ and most preferably $10^4$ to $3 \cdot 10^5$.

The EDCs, which can be removed by the process of the present invention are selected from the group comprising, e.g. endogenous hormones such as 17β-estradiol (E2), estrone (E1), estriol (E3), testosterone or dihydro testosterone; phyto and myco hormones such as β-sitosterol, genistein, daidzein or zeraleon; drugs such as 17α-ethinylestradiol (EE2), mestranol (ME), diethylstilbestrol (DES), and industrial chemicals such as 4-nonyl phenol (NP), 4-tert-octyl phenol (OP), bisphenol A (BPA), tributyltin (TBT), methylmercury, phthalates, PAK or PCB.

It has furthermore been found that the removal of EDCs from an aqueous medium is especially effective, when the surface-reacted calcium carbonate is used in combination with activated carbon.

As outlined above, activated carbon is a well-known potent adsorbent, having however the drawback that the adsorption very often is not very fast and that its removal from the medium to be treated is very difficult due to its fine division in the medium.

It now has been found that surface-reacted calcium carbonate not only very efficiently and fast removes EDCs from aqueous media, but also very efficiently adsorbs activated carbon alone as well as activated carbon which has already adsorbed substances such as EDCs onto its surface.

It is therefore an especially preferred embodiment of the present invention, that activated carbon is additionally added to the aqueous medium contain EDCs.

The activated carbonate can be added simultaneously with, prior to or after the addition of the surface-reacted calcium carbonate.

The use of surface-reacted calcium carbonate together with activated carbon on the one hand provides for a very efficient adsorption of substances such as EDCs by the excellent adsorption properties of both of the adsorbents, and on the other hand additionally improves the removability of activated carbon by forming composites therewith, also if it has already substances adsorbed onto its surfaces, resulting in a further improved removal of EDCs due to the synergistic interaction between surface-reacted calcium carbonate and activated carbon, the resulting composites being easily separable from the aqueous medium.

In this respect it is especially preferred that the activated carbon is added to the aqueous medium prior to the addition of the surface-reacted natural calcium carbonate. In this embodiment, the EDCs are essentially first adsorbed to the activated carbon and the resulting composite is essentially subsequently adsorbed by the surface-reacted calcium carbonate providing for an improved removability of the activated carbon, and the EDCs attached thereto, respectively.

Any activated carbon known in the art can be used in the process of the present invention. Examples of activated carbons useful in the present invention are e.g. available from Fluka, such as article No. 05112 (p.a. for gc; grain size 0.3 to 0.5 mm; bulk density 410 kg/m$^3$), from Aldrich such as article number 484156 (glassy spherical powder, grain size 10-40 µm), from Sigma-Aldrich such as article No. 242276 (Darco® G-60, powder, −100 mesh particle size); from Riedel-de Haen (article No. 18002, purum, granulated), or Lurgi Hydrafin CC 8×30 (Donau Carbon GmbH & Co. KG, Frankfurt am Main, Germany) or activated carbon available from Fluka (article No. 05112).

For example, the activated carbon particles can have a grain size of 0.1 µm to 5 mm, preferably 10 µm to 2 mm, 0.1 mm to 0.5 mm, e.g. 0.3 mm.

Preferably, the weight ratio of the surface-reacted natural calcium carbonate to the activated carbon is from 1:1 to 100:1, more preferably from 5:1 to 80:1, especially 10:1 to 70:1 or 20:1 to 50:1, e.g. 30:1 or 40:1.

Optionally, additives can be added to the water sample to be treated. These might include agents for pH adjustment and conventional flocculants such as polyaluminium chloride, iron chloride or aluminium sulphate.

In a preferred embodiment, a natural calcium carbonate which has not been surface-reacted as described above is added as well.

After the adsorption is completed the composites of surface-treated calcium carbonate, EDC, and, optionally activated carbon can be separated from the aqueous medium by conventional separation means known to the skilled person such as sedimentation and filtration.

In an alternative approach, the liquid to be purified is preferably passed through a permeable filter comprising the surface-reacted natural calcium carbonate and being capable of retaining, via size exclusion, the impurities on the filter surface as the liquid is passed through by gravity and/or under vacuum and/or under pressure. This process is called "surface filtration".

In another preferred technique known as depth filtration, a filtering aid comprising of a number of tortuous passages of varying diameter and configuration retains impurities by molecular and/or electrical forces adsorbing the impurities onto the surface-reacted natural calcium carbonate which is present within said passages, and/or by size exclusion, retaining the impurity particles if they are too large to pass through the entire filter layer thickness.

The techniques of depth filtration and surface filtration may additionally be combined by locating the depth filtration layer on the surface filter; this configuration presents the advantage that those particles that might otherwise block the surface filter pores are retained in the depth filtration layer.

One option to introduce a depth filtration layer onto the surface filter is to suspend a flocculating aid in the liquid to be filtered, allowing this aid to subsequently decant such that it flocculates all or part of the impurities as it is deposited on a surface filter, thereby forming the depth filtration layer. This is known as an alluvium filtration system. Optionally, an initial layer of the depth filtration material may be pre-coated on the surface filter prior to commencing alluvium filtration.

Due to the excellent adsorption properties of the surface-reacted calcium carbonate with respect to EDCs as defined above, its use for the removal of EDCs from an aqueous medium is a further aspect of the present invention.

In this respect, the use of surface-reacted calcium carbonate in combination with activated carbon as defined above for the removal of EDCs from an aqueous medium is an especially preferred embodiment.

A further aspect of the present invention is the combination of surface-reacted natural calcium carbonate as defined above and activated carbon as defined above for the removal of EDC s from an aqueous medium.

Finally, the composites of surface-reacted calcium carbonate as defined above and one or more EDCs adsorbed thereto are a further aspect of the invention, optionally also including the activated carbon as defined above.

The following figures, examples and tests will illustrate the present invention, but are not intended to limit the invention in any way.

EXAMPLES

A. Materials

A suspension of approximately 25 wt.-% based on the dry weight of finely divided natural calcium carbonate originating from Omey, France, was prepared. The slurry thus formed was then treated by slow addition of phosphoric acid at a temperature of approximately 55° C.

The resulting slurry had a BET specific surface area of 60 $m^2/g$ according to ISO standard 92777, and a $d_{50}$ of about 7 µm measured by means of the Sedigraph™ 5100 from Micromeritics™.

B. Method

1. Adsorption of 17α-ethinylestradiol

17α-ethinylestradiol (EE2) (>98% pure) was used, which is supplied by Sigma Aldrich (Bornem, Belgium) (article No. E4876).

a) Preparation of the Test Mixture

Figure 1:
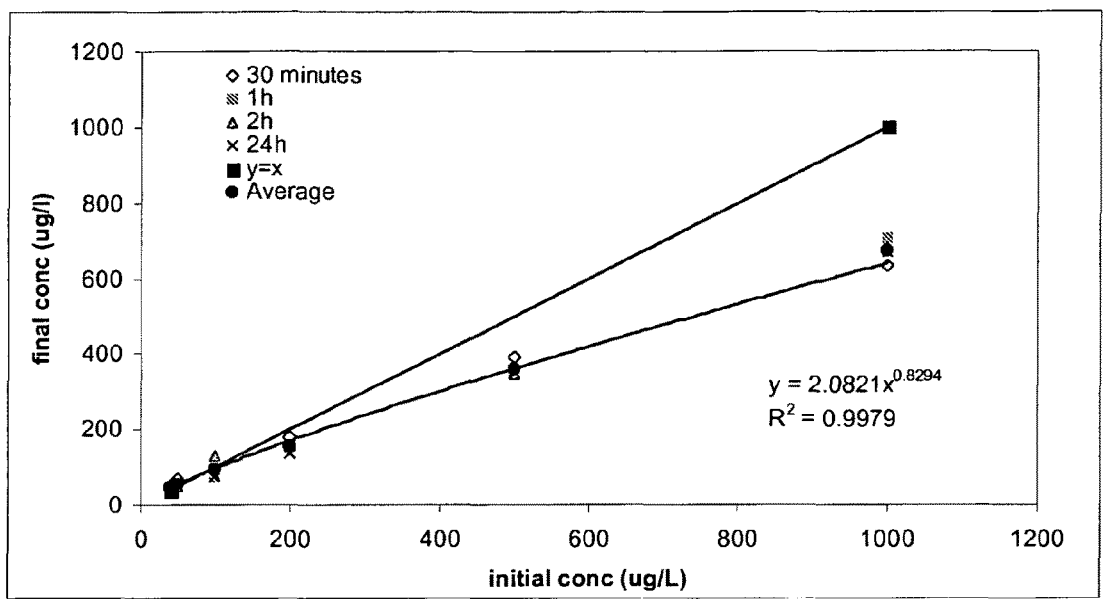
FIG. 1 shows the adsorption behaviour of 17α-ethinylestradiol on SRCC for different equilibration times.

A standard experiment was performed using the following procedure:

0.4 g SRCC suspension having a solids content of 25 Gew.-% was added to 7 ml of 17α-ethinylestradiol solution having different concentrations of 50, 100, 200, 500 and 1000 µg/l and shaken for 30 min., 1 h, 2 h and 24 h at 25° C.

b) Determination of the Equilibrium Concentration in the Adsorption of 17α-ethinylestradiol Onto the Surface of SRCC For the determination of the equilibrium concentration of 17α-ethinylestradiol with respect to the adsorption onto the surface of SRCC, the initial and final concentration after the addition of SRCC was measured at certain concentrations and treatment (shaking) times. It can be taken from FIG. 1 that the adsorption of 17α-ethinylestradiol onto the surface of SRCC was very fast and no change was observed after 30 minutes for any concentration, which indicates that the adsorption equilibrium is reached after 30 minutes, independently from the concentration.

The concentration was determined by the well-known method of HPLC (Column: Gemini 5 µm C18/ODS C18; Eluent A: Water (45%); Eluent B: Acetonitrile 55%; Eluent Type: Isocratic; Flow 1 ml/min; Temp. 25° C.; Detection: UV-Vis Absorption@ 205 nm)

c) Determination of Adsorption Isotherms of 17α-ethinylestradiol for SRCC and Activated Carbon For determining the efficiency of 17α-ethinylestradiol adsorption the adsorption isotherms were determined.

After the equilibrium time, the SRCC is separated from the liquid phase by settling, filtration or centrifugation. The concentration in the upper liquid phase is determined by the above described HPLC method, resulting in the equilibrium concentration. The lower solid phase is isolated by decantation of the supernatant phase. The SRCC is dissolved in a certain amount of hydrochloric acid and the concentration measured with the above mentioned method, resulting in the adsorbed amount per amount SRCC.

Based on the findings above, an equilibrium time of 1 h was used for the determination of the adsorption isotherm of 17α-ethinylestradiol with respect to SRCC.

Furthermore, the adsorption isotherm for activated carbon acting as the adsorbent was determined. The data for the activated carbon were measured after 16 hours. The activated carbon used was the commercially available Lurgi Hydrafin CC 8×30 (Donau Carbon GmbH & Co. KG, Frankfurt am Main, Germany). It has a grain size of 0.5 to 2.5 mm and a density of 480±50 $kg/m^3$.

Figure 2:
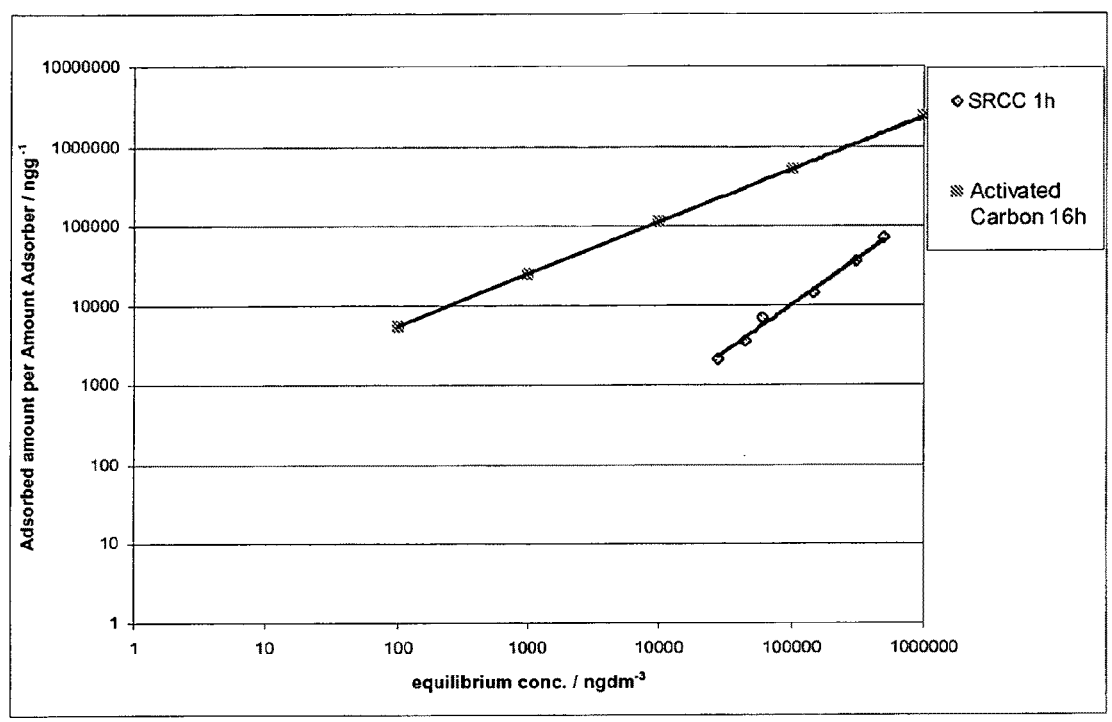
FIG. 2 shows the adsorption isotherms for the adsorption of 17α-ethinylestradiol on SRCC, activated carbon and manganese dioxide in terms of the adsorbed amount per amount of adsorbent.

From FIG. 2, it can be taken that in terms of the adsorbed amount of 17α-ethinylestradiol per amount of adsorbent in ng/g, the activated carbon is superior in 17α-ethinylestradiol adsorption.

Figure 3:
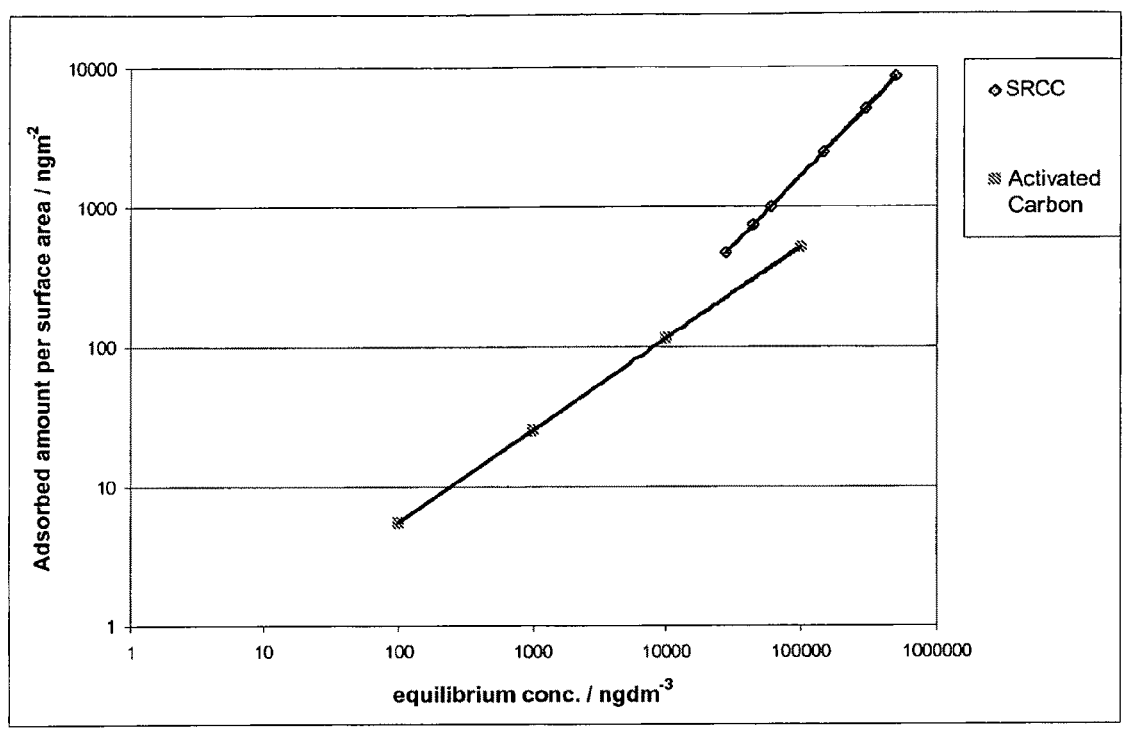
FIG. 3 shows the adsorption isotherms for the adsorption of 17α-ethinylestradiol on SRCC, activated carbon and manganese dioxide in terms of the adsorbed amount per surface area of adsorbent.

However, in terms of adsorbed amount of 17α-ethinylestradiol per surface area of adsorbent as given in FIG. 3, it can be seen that SRCC shows the same level of efficiency in 17α-ethinylestradiol adsorption, which is markedly higher than that of activated carbon.

These findings show that less activated carbon in terms of weight amount might be needed for adsorbing 17α-ethinylestradiol, but that SRCC is more effective in terms of its surface area, i.e. although it has a lower specific surface area, more estrogen per surface area is adsorbed.

Furthermore, it was found that the use of SRCC together with activated carbon shows an unexpected synergy.

2. Adsorption of Activated Carbon

As mentioned in the description, activated carbon cannot be separated easily from water. However, SRCC is able to clarify an activated carbon suspension nicely simplifying the separation of the active carbon.

Activated carbon, which is commercially available from Fluka (article No. 05112 (p.a. for gc; grain size 0.3 to 0.5 mm; bulk density 410 $kg/m^3$) and the SRCC were subjected to the following treatment:

0.02 g activated carbon was added to 30 g water. Then, 0.2 g SRCC was added, and the resulting mixture was shaken for 2 min. The mixture was allowed to settle. Subsequently, the upper phase was separated by decanting.

Figure 4:
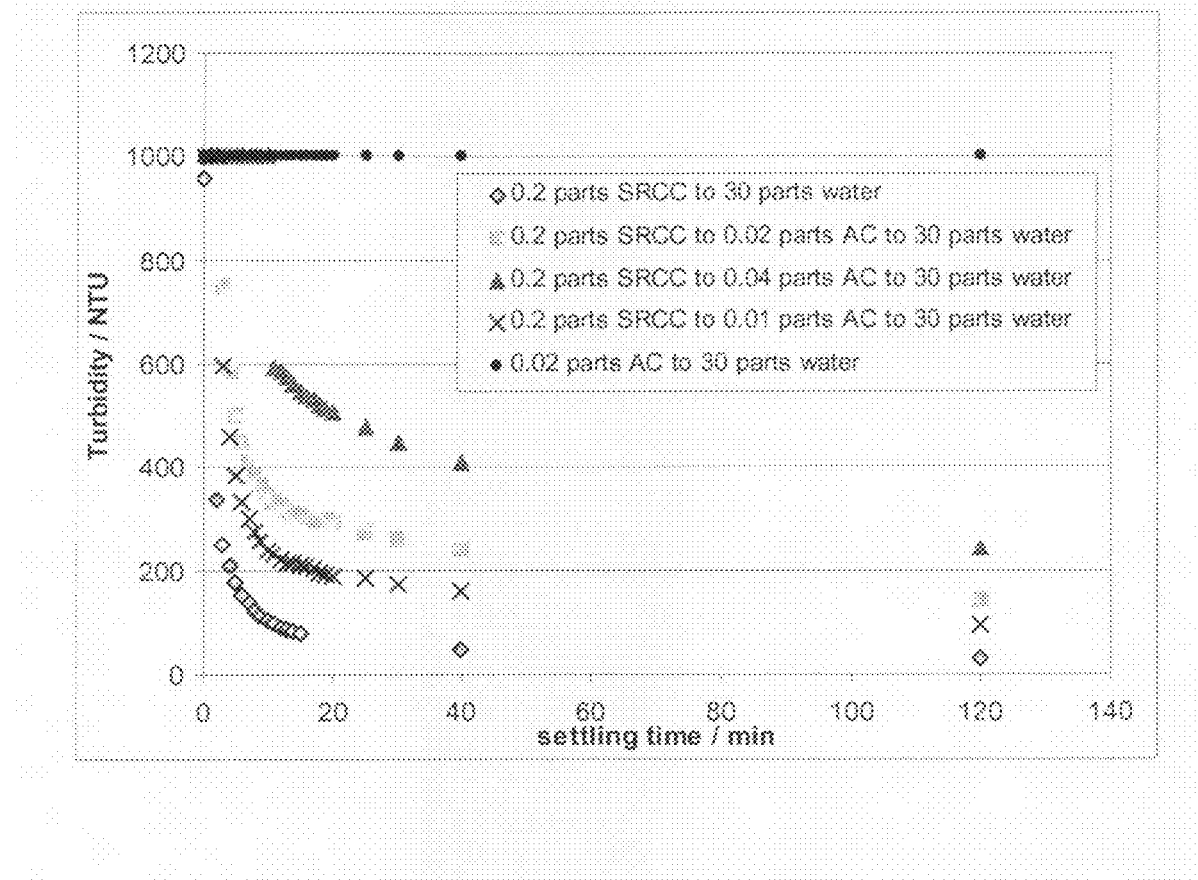
FIG. 4 shows the turbidity reduction by the adsorption of activated carbon by SRCC

From FIG. 4, it can be taken that turbidity of the upper liquid phase could be significantly reduced. The turbidity of pure activated carbon was constantly above 1000 NTU which is the maximal value which can be measured with this device (a Hach 2100P Iso Turbidimeter)

The resulting composites can be easily separated, e.g. by filtration

Figure 5:
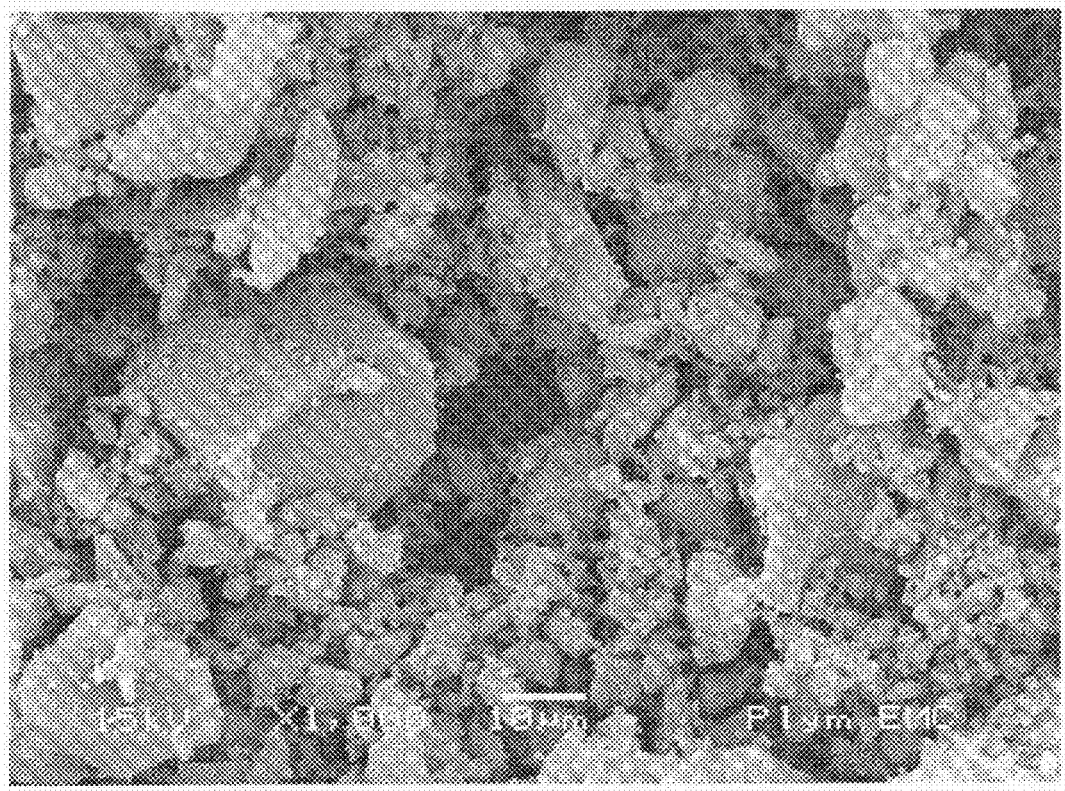
FIG. 5 shows a SEM image of activated carbon.

FIG. 5 shows a SEM image of activated carbon.

The invention claimed is:

1. A process for the removal of an endocrine disrupting compound (EDC) from an aqueous medium, comprising (a) contacting the aqueous medium with (i) surface treated natural calcium carbonate or an aqueous suspension comprising surface treated calcium carbonate having a pH of greater than 6.0 measured at 20° C., so that the surface-treated natural calcium carbonate absorbs an EDC wherein the surface treated calcium carbonate is formed by treating natural calcium carbonate with carbon dioxide and one or more acids, wherein the carbon dioxide is formed in situ by the acid treatment and/or is supplied from an external source; and (b) separating the surface-treated natural calcium carbonate with absorbed EDC from the aqueous medium.

2. The process according to claim 1, wherein the surface treated natural calcium carbonate is prepared as an aqueous suspension having a pH of greater than 6.5, measured at 20° C.

3. The process according to claim 1, wherein the natural calcium carbonate is marble, calcite, chalk and dolomite, limestone or mixtures thereof.

4. The process according to claim 1, wherein the acid has a $pK_a$ at 25° C. of 2.5 or less.

5. The process according to claim 4, wherein the acid is hydrochloric acid, sulphuric acid, sulphurous acid, hydrosulphate, phosphoric acid, oxalic acid or mixtures thereof.

6. The process according to claim 1, wherein the natural calcium carbonate is treated with the acid and the carbon dioxide in the presence of at least one silicate and/or silica, aluminum hydroxide, earth alkali metal aluminate, magnesium oxide, or mixtures thereof.

7. The process according to claim 6, wherein the at least one silicate is an aluminum silicate, a calcium silicate or an alkali metal silicate.

8. The process according to claim 1, wherein the surface treated natural calcium carbonate has a specific surface area of from 5 m$^2$/g to 200 m$^2$/g, measured using nitrogen and the BET method according to ISO 9277.

9. The process according to claim 1, wherein the surface treated natural calcium carbonate has a mean grain diameter $d_{50}$ of from 0.1 to 50 μm measured according to the sedimentation method.

10. The process according to claim 1, wherein the aqueous suspension of surface treated natural calcium carbonate is stabilized with one or more dispersants.

11. The process according to claim 1, wherein the surface treated natural calcium carbonate is used in powder form and/or in the form of granules.

12. The process according to claim 1, wherein the surface treated calcium carbonate is contacted with the aqueous medium at a dosage (weight-based) of $10^2$ to $10^9$ times the mass of EDC.

13. The process according to claim 1, wherein the pH of the aqueous medium is adjusted to a value of >6 before being brought into contact with the surface treated natural calcium carbonate.

14. The process according to claim 1, wherein the EDC is an endogenous hormone, 17β-estradiol (E2), estrone (E1), estriol (E3), testosterone, dihydro testosterone, a phyto hormone, a myco hormone, β-sitosterol, genistein, daidzein, zeraleon, a drug, 17α-ethinylestradiol (EE2), mestranol (ME), diethylstilbestrol (DES), an industrial chemical, 4-nonyl phenol (NP), 4-tert-octyl phenol (OP), bisphenol A (BPA), tributyltin (TBT), methylmercury, a phthalates, PAK or PCB.

15. The process according to claim 1, wherein activated carbon is brought into contact with the aqueous medium.

16. The process according to claim 15, wherein activated carbon is brought into contact with the aqueous medium prior to contacting the aqueous medium with the surface treated calcium carbonate.

17. The process according to claim 15, wherein the activated carbon has a grain size of 0.1 μm to 5 mm.

18. The process according to claim 15, wherein the weight ratio of the surface treated natural calcium carbonate to the activated carbon is from 1:1 to 100:1.

19. The process according to claim 1, wherein the surface-treated natural calcium carbonate is prepared as an aqueous suspension having a pH of greater than 7.0, measured at 20° C.

20. The process according to claim 1, wherein the surface-treated natural calcium carbonate is prepared as an aqueous suspension having a pH of greater than 7.5, measured at 20° C.

21. The process according to claim 1, wherein the surface-treated natural calcium carbonate has a specific surface area of from 20 m$^2$/g to 80 m$^2$/g, measured using nitrogen and the BET method according to ISO 9277.

22. The process according to claim 1, wherein the surface-treated natural calcium carbonate has a specific surface area of from 30 m$^2$/g to 60 m$^2$/g, measured using nitrogen and the BET method according to ISO 9277.

23. The process according to claim 1, wherein the surface-treated natural calcium carbonate has a mean grain diameter $d_{50}$ of from 0.5 to 25 μm, measured according to the sedimentation method.

24. The process according to claim 1, wherein the surface-treated natural calcium carbonate has a mean grain diameter $d_{50}$ of from 0.8 to 20 μm, measured according to the sedimentation method.

25. The process according to claim 1, wherein the surface-treated natural calcium carbonate has a mean grain diameter $d_{50}$ of from 1.0 to 10 μm, measured according to the sedimentation method.

26. The process according to claim 1, wherein the surface-treated calcium carbonate is contacted with the aqueous medium at a dosage (weight-based) of $2 \cdot 10^4$ to $10^6$ times the mass of EDC.

27. The process according to claim 1, wherein the surface-treated calcium carbonate is contacted with the aqueous medium at a dosage (weight-based) of $10^4$ to $3 \cdot 10^5$ times the mass of EDC.

28. The process according to claim 1, wherein the pH of the aqueous medium is adjusted to a value of >6.5 before being brought into contact with the surface-treated natural calcium carbonate.

29. The process according to claim 1, wherein the pH of the aqueous medium is adjusted to a value of >7 before being brought into contact with the surface-treated natural calcium carbonate.

30. The process according to claim 15, wherein the activated carbon has a grain size of 10 μm to 2 mm.

31. The process according to claim 15, wherein the activated carbon has a grain size of 0.1 μm to 0.5 mm.

32. The process according to claim 15, wherein the activated carbon has a grain size of 0.3 μm.

33. The process according to claim 15, wherein the weight ratio of the surface-treated natural calcium carbonate to the activated carbon is from 5:1 to 80:1.

34. The process according to claim 15, wherein the weight ratio of the surface-treated natural calcium carbonate to the activated carbon is from 10:1 to 70:1.

35. The process according to claim 15, wherein the weight ratio of the surface-treated natural calcium carbonate to the activated carbon is from 20:1 to 50:1.

36. The process according to claim 15, wherein the weight ratio of the surface-treated natural calcium carbonate to the activated carbon is from 30:1.

37. The process according to claim 15, wherein the weight ratio of the surface-treated natural calcium carbonate to the activated carbon is from 50:1.

38. The process according to claim 1, wherein the carbon dioxide is formed in situ by the acid treatment.

39. The process according to claim 1, wherein the carbon dioxide is supplied from an external source.

* * * * *